US010530652B2

(12) United States Patent
Ayyagari et al.

(10) Patent No.: US 10,530,652 B2
(45) Date of Patent: Jan. 7, 2020

(54) OUTAGE AVOIDANCE FOR CONNECTED DEVICES

(71) Applicant: International Business Machines Corporation, Armonk, NY (US)

(72) Inventors: Phani Kumar V. U. Ayyagari, Hyderabad (IN); Manish A. Bhide, Hyderabad (IN); Madan K. Chukka, Hyderabad (IN); Purnachandra R. Jasti, Hyderabad (IN); Srikanth Kondapaneni, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 15/414,658

(22) Filed: Jan. 25, 2017

(65) Prior Publication Data
US 2018/0212840 A1 Jul. 26, 2018

(51) Int. Cl.
*H04L 12/24* (2006.01)
*G06Q 10/06* (2012.01)
*G06Q 50/00* (2012.01)
*G06Q 50/06* (2012.01)

(52) U.S. Cl.
CPC ... *H04L 41/0873* (2013.01); *G06Q 10/06314* (2013.01); *G06Q 50/01* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 7,440,973 B2 | 10/2008 | Tsukerman et al. | |
| 9,297,723 B1 | 3/2016 | Hofmann et al. | |
| 2012/0302295 A1 | 11/2012 | Bishop et al. | |
| 2013/0263035 A1 | 10/2013 | Simmons et al. | |
| 2014/0088780 A1 | 3/2014 | Chen | |
| 2014/0156082 A1* | 6/2014 | Ha | D06F 33/02 700/275 |
| 2014/0215486 A1 | 7/2014 | DeRosa et al. | |
| 2014/0244768 A1 | 8/2014 | Shuman et al. | |
| 2014/0258539 A1 | 9/2014 | Heninger et al. | |

(Continued)

FOREIGN PATENT DOCUMENTS

WO 2015052512 A1 4/2015

OTHER PUBLICATIONS

Appendix P List of IBM Applications or Patents Treated as Related dated Feb. 19, 2018. Two pages.

(Continued)

*Primary Examiner* — Joshua Joo
(74) *Attorney, Agent, or Firm* — Steven R. Yoder

(57) ABSTRACT

An approach for outage avoidance. The approach receives a scheduled task, wherein the scheduled task is completed at a scheduled time by a device. The approach receives an outage time of a service disruption, wherein the service disruption occurs at the outage time. The approach determines whether the service disruption conflicts with the scheduled task, based on the outage time and the scheduled time. Responsive to a determination that the service disruption conflicts with the scheduled task, the approach modifies the scheduled task to be completed at a modified time, wherein the outage time does not conflict with the modified time.

20 Claims, 3 Drawing Sheets

(56) References Cited

U.S. PATENT DOCUMENTS

| | | | |
|---|---|---|---|
| 2015/0319474 A1* | 11/2015 | Earle | H04N 21/4825 |
| | | | 725/32 |
| 2015/0369878 A1 | 12/2015 | Janssen et al. | |
| 2016/0205106 A1 | 7/2016 | Yacoub et al. | |
| 2017/0023369 A1* | 1/2017 | Mohler | H04W 4/90 |
| 2017/0063615 A1 | 3/2017 | Yang et al. | |
| 2017/0083072 A1* | 3/2017 | Dauneria | H04W 24/00 |
| 2017/0344402 A1* | 11/2017 | Pulaski | G06F 9/4843 |
| 2018/0091963 A1* | 3/2018 | Cottle | H04W 4/90 |

OTHER PUBLICATIONS

Ayyagari et al. Original U.S. Appl. No. 15/898,971, filed Feb. 19, 2018.

* cited by examiner

OUTAGE AVOIDANCE FOR CONNECTED DEVICES

BACKGROUND OF THE INVENTION

The present invention relates generally to the field of task automation, and more particularly to avoidance of interruptions of automated tasks.

Connected devices enable automation of common tasks, such as household chores. Many users may wish to schedule noisy, or otherwise bothersome, tasks to be completed at a more convenient time. Many regions have foreseeable outages, or disruptions, in utility services, which may interrupt completion of the tasks.

SUMMARY

Aspects of an embodiment of the present invention disclose a method, computer program product, and a computer system for outage avoidance. The method may include receiving, by one or more computer processors, a scheduled task, wherein the scheduled task is completed at a scheduled time by a device. The method may further include receiving, by the one or more computer processors, an outage time of a service disruption, wherein the service disruption occurs at the outage time. The method may further include determining, by the one or more computer processors, whether the service disruption conflicts with the scheduled task, based on the outage time and the scheduled time. Responsive to a determination that the service disruption conflicts with the scheduled task, the method may further include modifying, by the one or more computer processors, the scheduled task to be completed at a modified time, wherein the outage time does not conflict with the modified time.

DETAILED DESCRIPTION

Embodiments of the present invention recognize that utility outages can disrupt completion of an automated task. Embodiments of the present invention recognize that many outages are planned or foreseeable. Embodiments of the present invention provide the capability to avoid operation of automated tasks during an outage. Embodiments of the present invention provide the capability to reschedule an automated task to be completed without interruption by an outage. Embodiments of the present invention provide the capability to complete actions prior to an outage to mitigate the effect of the outage.

Implementation of embodiments of the invention may take a variety of forms, and exemplary implementation details are discussed subsequently with reference to the Figures. The present invention will now be described in detail with reference to the Figures.

Figure 1:
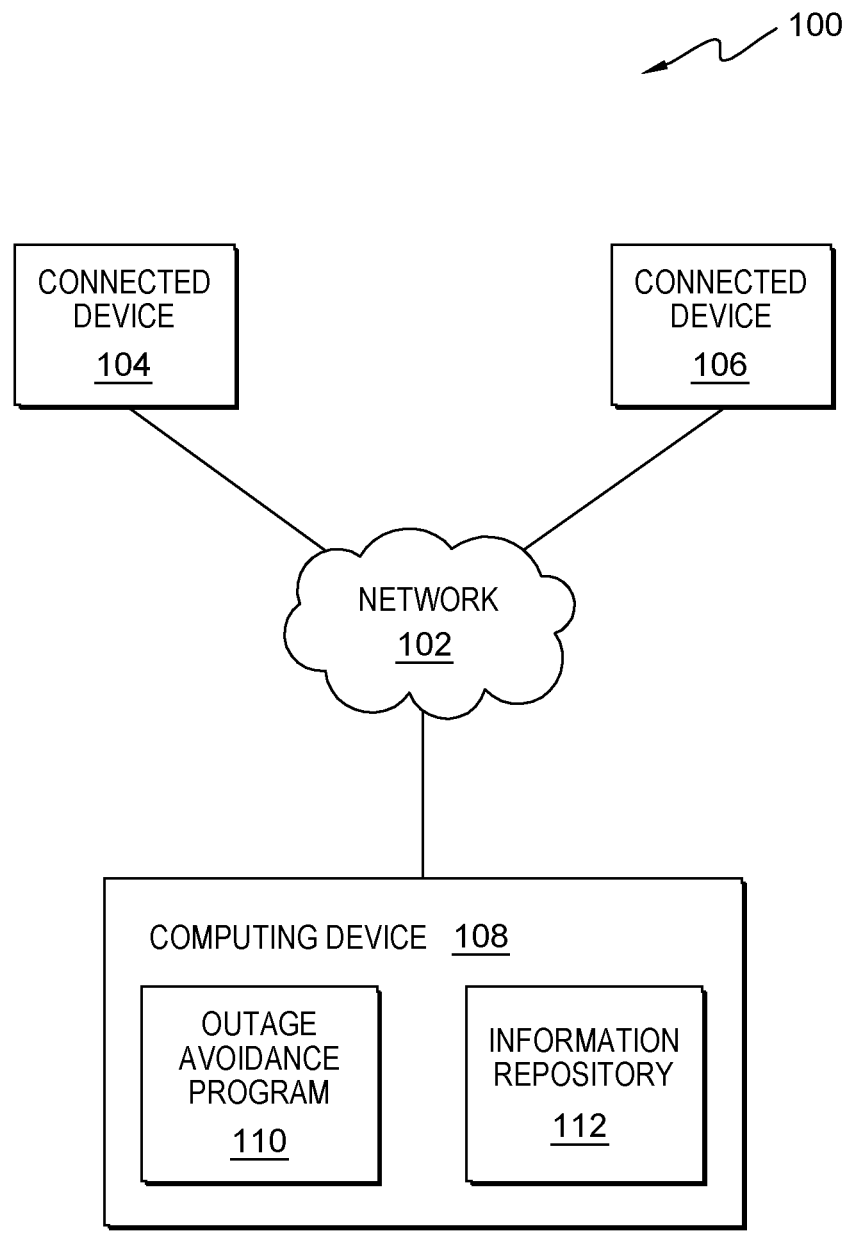
FIG. 1 is a functional block diagram illustrating a distributed data processing environment, in accordance with an embodiment of the present invention.

FIG. 1 is a functional block diagram illustrating a distributed data processing environment, generally designated 100, in accordance with an embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network 102 may be any combination of connections and protocols capable of supporting communications between connected device 104, connected device 106, and computing device 108. Network 102 may include wire cables, wireless communication links, fiber optic cables, routers, switches and/or firewalls. Connected device 104, connected device 106, and computing device 108 are interconnected by network 102. In one embodiment, network 102 may be the Internet, representing a worldwide collection of networks and gateways that use TCP/IP protocols to communicate with one another. In other embodiments, network 102 may be implemented as a number of different types of networks, such as an intranet, a local area network (LAN), a virtual local area network (VLAN), or a wide area network (WAN). FIG. 1 is intended as an example and not as an architectural limitation for the different embodiments.

Connected device 104 and connected device 106 represent any number of devices, which can process data and communicate through network 102. In some embodiments, more than two connected devices may be present. In one embodiment, connected device 104 and connected device 106 are household appliances. For example, connected device 104 and connected device 106 may be a washer, dishwasher, refrigerator, furnace, or air conditioner. In another embodiment, connected device 104 and connected device 106 are controller devices for household appliances. In yet another embodiment, connected device 104 and connected device 106 control fixtures. For example, connected device 104 and connected device 106 may control light fixtures, thermostats, alarm systems, and smoke detectors. In one embodiment, connected device 104 and connected device 106 control the operation of an appliance. For example, connected device 104 may monitor and adjust the temperature in a refrigerator. In one embodiment, connected device 104 and connected device 106 each contain a user interface. In one embodiment, connected device 104 and connected device 106 include outage avoidance program 110, and connected device 104 and connected device 106 are capable of executing outage avoidance program 110.

Computing device 108 may be a server computer system such as a management server, a web server, or any other electronic device or computing system capable of sending and receiving data. In one embodiment, computing device 108 may be a data center, consisting of a collection of networks and servers providing an IT service, such as virtual servers and applications deployed on virtual servers, to an external party. In another embodiment, computing device 108 represents a "cloud" of computers interconnected by one or more networks, where computing device 108 is a computing system utilizing clustered computers and components to act as a single pool of seamless resources when accessed through network 102. This is a common implementation for data centers in addition to cloud computing applications. In still another embodiment, computing device 108 may be a desktop computer, laptop computer, a tablet computer, mobile device, or any other electronic device or computing system capable of communicating with connected device 104 and connected device 106 through network 102. In one embodiment, computing device 108 represents a general-purpose computing device, such as computer system 310 of FIG. 3. In one embodiment, computing device 108 includes outage avoidance program 110 and information repository 112.

Outage avoidance program 110 may be a software-based application, operating on a computer system for rescheduling tasks to avoid operation during a utility service disruption, such as electricity or water service outages. Outage avoidance program 110 may determine whether action is needed to mitigate the effects of an outage, and outage avoidance program 110 may schedule any necessary mitigating actions. Outage avoidance program 110 may receive outage information. For example, outage avoidance program 110 may receive information from service providers, such as electricity, water, gas, phone, or internet providers. In another example, outage avoidance program 110 may retrieve outage information from information feeds, such as service provider, weather, news agency, or social media websites. In one embodiment, outage avoidance program 110 operates on computing device 108. In another embodiment, outage avoidance program 110 operates on each connected device, such as connected device 104 and connected device 106. In one embodiment, outage avoidance program 110 stores outage information in information repository 112. The operations performed by outage avoidance program 110 are discussed further in the description of FIG. 2.

Information repository 112 may be persistent storage media on computing device 108, containing outage information. For example, information repository 112 may contain information regarding outages of electricity, water, gas, phone, or internet service. In one embodiment, information repository 112 stores outage information from a central server. For example, outage avoidance program 110 may receive outage information from a central server, and outage avoidance program 110 may store the outage information in information repository 112. In another embodiment, information repository 112 stores information from a service provider, such as an electric company or internet service provider (ISP). For example, outage avoidance program 110 may receive planned outage information from an electric company, and outage avoidance program 110 may store the received outage information in information repository 112. In still another embodiment, information repository 112 stores outage information from information feeds. For example, outage avoidance program 110 may search information feeds, such as service providers, weather companies, news agencies and social media, and outage avoidance program 110 may store the outage information in information repository 112. In yet another embodiment, information repository 112 stores outage information from connected devices, such as connected device 104 and connected device 106.

Information repository 112 may be implemented using any volatile or non-volatile storage media for storing information, as known in the art. For example, information repository 112 may be implemented with a tape library, optical library, one or more independent hard disk drives, multiple hard disk drives in a redundant array of independent disks (RAID), solid-state drives (SSD), or random-access memory (RAM). Similarly, information repository 112 may be implemented with any suitable storage architecture known in the art, such as a relational database, an object-oriented database, or one or more tables.

Figure 2:
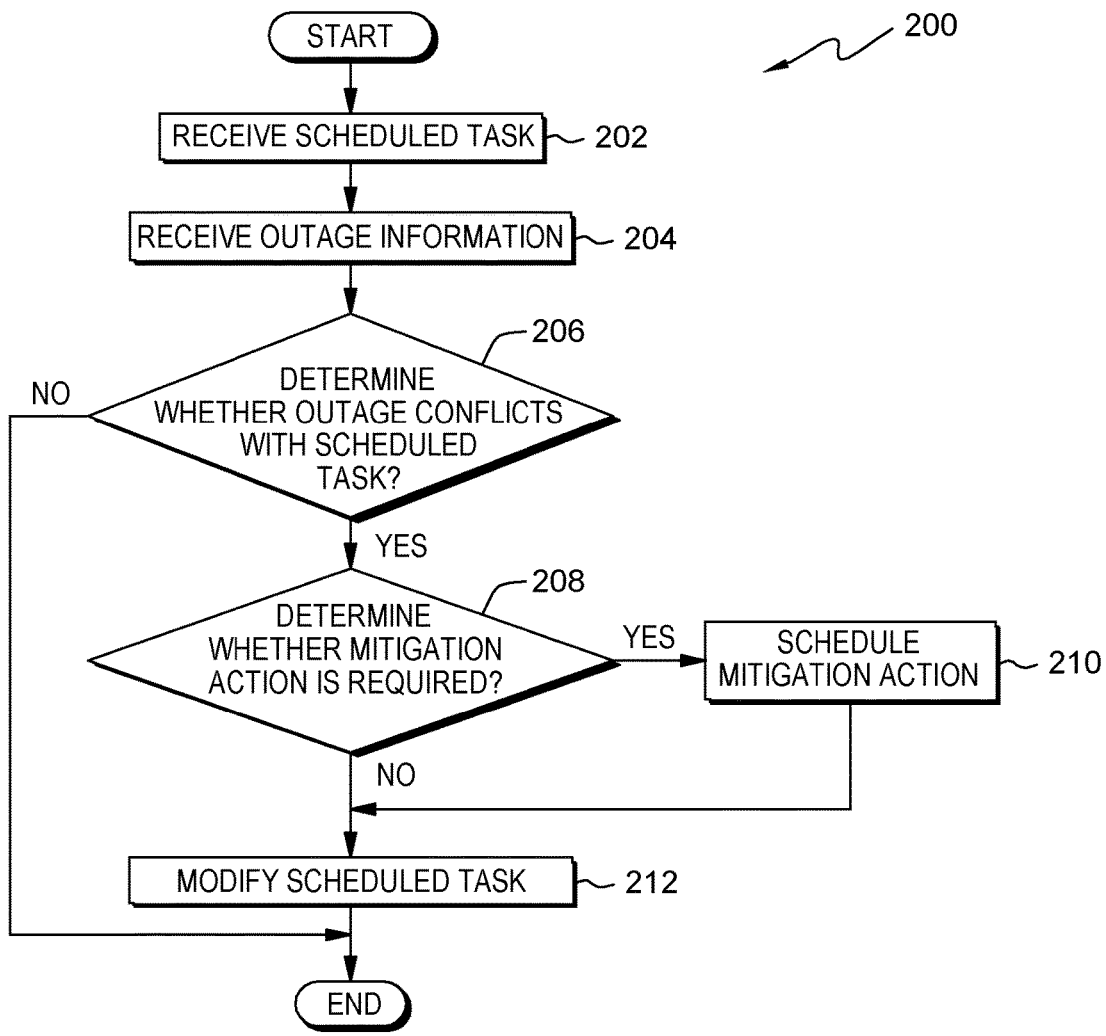
FIG. 2 is a flowchart depicting operational steps of an outage avoidance program, such as the outage avoidance program of FIG. 1, in accordance with an embodiment of the present invention.

FIG. 2 is a flowchart, generally designated 200, depicting operational steps of outage avoidance program 110, in accordance with an embodiment of the present invention. The operational steps are in an order according to one embodiment. In other embodiments, the functions noted in the flowchart can occur out of the order noted in FIG. 2. Modifications to the depicted order may be made by those skilled in the art without departing from the scope of the invention as recited by the claims.

Outage avoidance program 110 receives a scheduled task (202). In one embodiment, outage avoidance program 110 receives a scheduled task by retrieving task information from connected devices, such as connected device 106 and connected device 108. For example, where connected device 106 is scheduled to begin operation at 7 p.m., outage avoidance program 110 may retrieve the task details from connected device 106, including the start time of 7 p.m. In another embodiment, outage avoidance program 110 receives a scheduled task by receiving input from a user. For example, outage avoidance program 110 may receive a scheduled task from a user via a device connected to network 102, such as a mobile device.

Outage avoidance program 110 receives outage information (204). Outage avoidance program 110 may receive outage information by retrieving information from an information repository, such as information repository 112. For example, outage avoidance program 110 may retrieve outage information stored in information repository 112, such as information regarding which services will be unavailable, when the outage will begin, and the duration of the outage. In one embodiment, outage avoidance program 110 receives outage information by retrieving outage information from a service provider via information repository 112. For example, outage avoidance program 110 may receive information from an electric company that an outage is planned for 7 p.m. to 9 p.m. by retrieving the outage information from information repository 112. In another embodiment, outage avoidance program 110 receives outage information from information repository 112 via a notification. For example, outage avoidance program 110 may receive a notification with outage information from information repository 112. In still another embodiment, outage avoidance program 110 receives outage information by retrieving outage information from social media via information repository 112. For example, outage avoidance program 110 may retrieve outage information from a social media feed operated by an electric company.

In one embodiment, outage avoidance program 110 receives outage information by determining outage information based on information feeds. For example, outage avoidance program 110 may apply natural language processing (NLP) to determine outage information based on information received from an electric company, a weather company, a news agency, or social media. In another example, outage avoidance program 110 may determine outage information based on information received from connected devices, such as connected device 104 and connected device 106. In another embodiment, outage avoidance program 110 weights received information when determining outage information. For example, outage avoidance program 110 may assign a greater weight to information from an electric company than to information from social media. In still another embodiment, outage avoidance program 110 applies a confidence threshold when determining outage information. For example, outage avoidance program 110 may require information from a minimum number of sources to determine outage information from the sources. In one embodiment, outage avoidance program 110 receives rules from a user that determine the feeds from which to receive information. In one embodiment, outage avoidance program 110 receives raw information from a feed, and outage avoidance program 110 processes the raw information to determine outage information.

Outage avoidance program 110 determines whether the outage conflicts with the scheduled task (206). Outage avoidance program 110 may determine whether the outage conflicts with the scheduled task by comparing the outage schedule to the scheduled task schedule. For example, outage avoidance program 110 may determine that an outage conflicts with a scheduled task when the start time or the end time of the scheduled task is between the start time and end time of the outage. In another example, when the operation of a scheduled task occurs outside an outage, outage avoidance program 110 may determine that the outage does not conflict with the scheduled task. In still another example, where a scheduled task requires ongoing operation, outage avoidance program 110 may determine that the outage conflicts with the scheduled task.

Responsive to a determination that the outage will not conflict with the scheduled task ("NO" branch 206), outage avoidance program 110 completes operation. In one embodiment, responsive to a determination that the outage will not conflict with the scheduled task, outage avoidance program 110 stops processing. In another embodiment, responsive to a determination that the outage will not conflict with the scheduled task, outage avoidance program 110 repeats operation. For example, responsive to a determination that the outage will not conflict with a first scheduled task, outage avoidance program 110 may receive a second scheduled task, and outage avoidance program 110 may proceed with the operational steps as described above.

Responsive to determination that the outage will conflict with the scheduled task ("YES" branch 206), outage avoidance program 110 determines whether mitigation action is required (208). Outage avoidance program 110 may determine whether mitigation action is required by determining whether the scheduled task requires a finite execution time or whether the scheduled task requires ongoing operation. For example, where a scheduled task requires one hour for operation, such as a cleaning cycle for a dishwasher, outage avoidance program 110 may determine that mitigation action is not required. In another example, where a scheduled task requires ongoing operation, such as maintaining proper temperature in a refrigerator, outage avoidance program 110 may determine that mitigation action is required.

Responsive to a determination that mitigation action is not required ("NO" branch 208), outage avoidance program 110 reschedules the scheduled task (212), as described below.

Responsive to a determination that mitigation action is required ("YES" branch 208), outage avoidance program 110 schedules mitigation action (210). Outage avoidance program 110 may schedule a mitigation action by instructing a connected device to alter operation prior to the start of the outage. For example, where connected device 106 is a refrigerator, outage avoidance program 110 may instruct connected device 106 to lower the temperature prior to an electrical outage to maintain a safe food storage temperature during the outage.

In one embodiment, outage avoidance program 110 determines what action is required to mitigate the effect of the outage. For example, outage avoidance program 110 may determine what temperature is required in a refrigerator prior to an outage to maintain a safe food storage temperature throughout the outage, based on the duration of the outage. In another embodiment, outage avoidance program 110 receives logical rules from a user, which control how mitigation actions are scheduled. For example, outage avoidance program 110 may receive a user rule from a user interface on connected device 106 via network 102. In another example, outage avoidance program 110 may receive a rule from a user to set a refrigerator to a specific temperature prior to an electrical outage. In yet another embodiment, outage avoidance program 110 receives rules from a device manufacturer. For example, outage avoidance program 110 may be programed with rules at a factory. In another example, outage avoidance program 110 may receive rules from a manufacturer via a firmware update. In still another embodiment, outage avoidance program 110 prompts a user to input a mitigation action. For example, outage avoidance program 110 may notify a user with outage information, and outage avoidance program 110 may receive user input from computing device 108 via network 102.

Outage avoidance program 110 modifies the scheduled task (212). Outage avoidance program 110 may modify the scheduled task by instructing a connected device to start the scheduled task at a time outside the outage. For example, outage avoidance program 110 may change a scheduled task on connected device 104, such as a cleaning cycle for a dishwasher, to begin operation after the end time of a water outage, and outage avoidance program 110 may transmit the modified task to connected device 104 via network 102. In another example, outage avoidance program 110 may schedule an ongoing task, such as maintaining a safe temperature in a refrigerator, to resume normal operation after the end time of an electrical outage. In one embodiment, outage avoidance program 110 receives logical rules from a user, which control how tasks are modified. For example, program 110 may receive a rule from a user to reschedule a scheduled task to start 30 minutes after the end of an outage. In another embodiment, outage avoidance program 110 receives rules from a manufacturer. For example, outage avoidance program 110 may be programmed with rules at a factory. In another example, outage avoidance program 110 may receive rules from a manufacturer via a firmware update.

In one embodiment, responsive to rescheduling a scheduled task, outage avoidance program 110 stops processing. In another embodiment, responsive to rescheduling a scheduled task, outage avoidance program 110 repeats operation. For example, responsive to rescheduling a first scheduled task, outage avoidance program 110 may receive a second scheduled task, and outage avoidance program 110 may proceed with the operational steps as described above.

Figure 3:
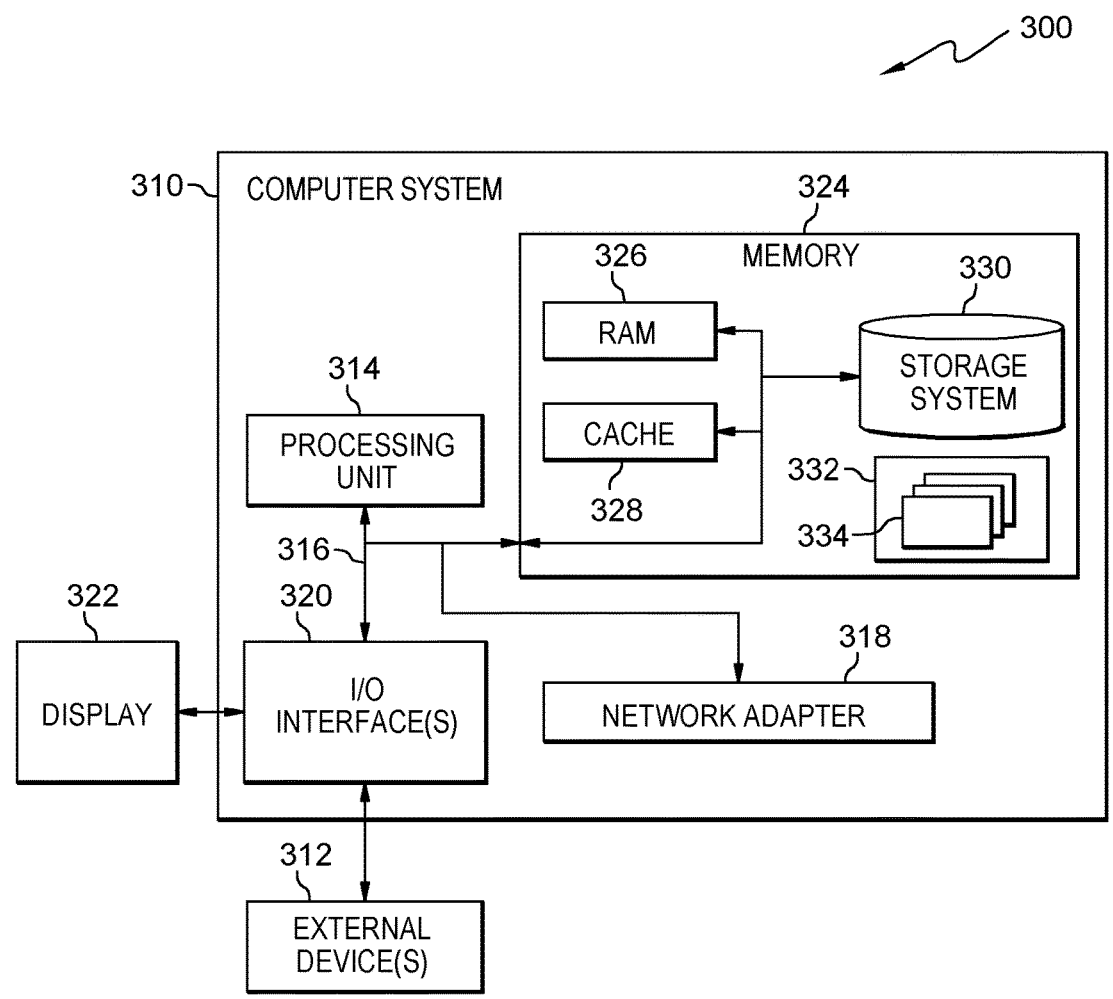
FIG. 3 depicts a block diagram of components of a computer system capable of executing outage avoidance program, such as the computing device of FIG. 1, in accordance with an embodiment of the present invention.

FIG. 3 depicts a block diagram, generally designated 300, of components of computer system capable of executing recovery program 110, such as computing device 108, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In one embodiment, computing device 108 in distributed data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

As used herein, "application," "mobile application," or "app" encompasses application software that runs on (or is capable of running on) mobile devices and performs specific tasks for a user of the mobile device. In general, applications encompass any software file comprising instructions that can be understood and processed on a computing device, such as, for example, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++). Applications may include native applications (pre-installed on the mobile device by a vendor) such as address books, calendars, calculators, games, maps, and web browsers. Applications may also be downloaded from a plurality of application software distribution platforms via a network for execution on a mobile device, such as efficient booting system.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computer operated by a user, partly on the user-operated computer, as a stand-alone software package, partly on the user-operated computer and partly on a remote computer or entirely on the remote computer or server. In the latter scenario, the remote computer may be connected to the user-operated computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A method for outage avoidance, the method comprising:

receiving, by one or more computer processors, task information from an internet-connected device, including a scheduled time to start a first task and a duration of the first task, wherein the first task is performed by the internet-connected device;

monitoring, by the one or more computer processors, a social media news feed for notice of an outage time of a disruption in a utility service, wherein the utility service is required for performance of the first task by the internet-connected device;

determining, by the one or more computer processors, whether the outage time of the disruption conflicts with the scheduled time; and responsive to a determination that the disruption conflicts with the scheduled time, modifying, by the one or more computer processors, the scheduled time to be outside the outage time.

2. The method of claim 1, further comprising:

responsive to modifying the scheduled time, transmitting, by the one or more computer processors, the modified scheduled time to the device.

3. The method of claim 1, wherein monitoring, by the one or more computer processors, the social media news feed for the notice of the outage time of the disruption in the utility service, further comprises:

receiving, by the one or more computer processors, the notice from a service provider, wherein the service provider is a provider of electricity, water, gas, phone or internet; and determining, by the one or more computer processors, the outage time, based on the notice.

4. The method of claim 1, wherein monitoring, by the one or more computer processors, the social media news feed for notice of the outage time of the disruption in the utility service, further comprises:
- receiving, by the one or more computer processors, the social media news feed from at least one of: one or more service providers, one or more weather companies, one or more news agencies, and one or more social media;
- processing, by the one or more computer processors, the social media news feed, wherein processing includes applying natural language processing to the social media news feed;
- determining, by the one or more computer processors, the disruption; and
- determining, by the one or more computer processors, the outage time of the disruption.

5. The method of claim 4, wherein monitoring, by the one or more computer processors, the social media news feed for notice of the outage time of the disruption in the utility service, further comprises:
- receiving, by the one or more computer processors, one or more feed rules, wherein the one or more feed rules determine the social media news feed;
- receiving, by the one or more computer processors, one or more weight rules, wherein the one or more weight rules determine a weight applied to each news feed;
- weighting, by the one or more computer processors, the social media news feed; and
- determining, by the one or more computer processors, the outage time of the disruption, based on the weight of the social media news feed.

6. The method of claim 1, wherein modifying, by the one or more computer processors, the scheduled time, further comprises:
- determining, by the one or more computer processors, whether a mitigation action is required, wherein the mitigation action reduces an effect of the disruption;
- responsive to a determination that the mitigation action is required, determining, by the one or more computer processors, the mitigation action, wherein the mitigation action is completed at a mitigation time by the internet-connected device;
- scheduling, by the one or more computer processors, the mitigation action; and
- transmitting, by the one or more computer processors, the mitigation action to the internet-connected device.

7. The method of claim 1, wherein modifying, by the one or more computer processors, the scheduled time, further comprises:
- receiving, by the one or more computer processors, one or more mitigation rules;
- determining, by the one or more computer processors, whether a mitigation action is required, wherein the one or more mitigation rules determine whether a mitigation action is required;
- responsive to a determination that a mitigation action is required, determining, by the one or more computer processors, the mitigation action, wherein the one or more mitigation rules determine the mitigation action;
- scheduling, by the one or more computer processors, the mitigation action; and
- transmitting, by the one or more computer processors, the mitigation action to the internet-connected device.

8. A computer program product for outage avoidance, the computer program product comprising:
- one or more computer readable storage media and program instructions stored on the one or more computer readable storage media, the stored program instructions comprising:
- program instructions to receive task information from an internet-connected device, including a scheduled time to start a first task and a duration of the first task, wherein the first task is performed by the internet-connected device;
- program instructions to monitor a social media news feed for notice of an outage time of a disruption in a utility service, wherein the utility service is required for performance of the first task by the internet-connected device;
- program instructions to determine whether the outage time of the disruption conflicts with the scheduled time; and
- responsive to a determination that the service disruption conflicts with the scheduled time, program instructions to modify the scheduled time to be outside the outage time.

9. The computer program product of claim 8, further comprising:
- responsive to modifying the scheduled time, program instructions to transmit the modified scheduled time to the device.

10. The computer program product of claim 8, wherein the program instructions to monitor the social media news feed for the notice of the outage time of the disruption in the utility service, further comprise:
- program instructions to receive the notice from a service provider, wherein the service provider is a provider of electricity, water, gas, phone or internet; and
- program instructions to determine the outage time, based on the notice.

11. The computer program product of claim 8, wherein the program instructions to monitor the outage time of the disruption in the utility service, further comprise:
- program instructions to receive the social media news feed from at least one of: one or more service providers, one or more weather companies, one or more news agencies, and one or more social media;
- program instructions to process the social media news feed, wherein processing includes applying natural language processing to the social media news feed;
- program instructions to determine the disruption; and
- program instructions to determine the outage time of the disruption.

12. The computer program product of claim 11, wherein the program instructions to monitor the outage time of the disruption in the utility service, further comprise:
- program instructions to receive one or more feed rules, wherein the one or more feed rules determine the social media news feed;
- program instructions to receive one or more weight rules, wherein the one or more weight rules determine a weight applied to each news feed;
- program instructions to weight the social media news feed; and
- program instructions to determine the outage time of the disruption, based on the weight of the social media news feed.

13. The computer program product of claim 8, wherein the program instructions to modify the scheduled time, further comprise:

program instructions to determine whether a mitigation action is required, wherein the mitigation action reduces an effect of the disruption;
responsive to a determination that the mitigation action is required, program instructions to determine the mitigation action, wherein the mitigation action is completed at a mitigation time by the internet-connected device;
program instructions to schedule the mitigation action; and
program instructions to transmit the mitigation action to the internet-connected device.

14. The computer program product of claim 8, wherein the program instructions to modify the scheduled time, further comprise:
program instructions to receive one or more mitigation rules;
program instructions to determine whether a mitigation action is required, wherein the one or more mitigation rules determine whether a mitigation action is required;
responsive to a determination that a mitigation action is required, program instructions to determine the mitigation action, wherein the one or more mitigation rules determine the mitigation action;
program instructions to schedule the mitigation action; and
program instructions to transmit the mitigation action to the internet-connected device.

15. A computer system for outage avoidance, the computer system comprising:
one or more computer processors;
one or more computer readable storage media; and
program instructions stored on the one or more computer readable storage media, the stored program instructions comprising:
program instructions to receive task information from an internet-connected device, including a scheduled time to start a first task and a duration of the first task, wherein the first task is performed by the internet-connected device;
program instructions to monitor a social media news feed for notice of an outage time of a disruption in a utility service, wherein the utility service is required for performance of the first task by the internet-connected device;
program instructions to determine whether the outage time of the disruption conflicts with the scheduled time; and
responsive to a determination that the service disruption conflicts with the scheduled time, program instructions to modify the scheduled time to be outside the outage time.

16. The computer system of claim 15, wherein the program instructions to monitor the social media news feed for the notice of the outage time of the disruption in the utility service, further comprise:
program instructions to receive the notice from a service provider, wherein the service provider is a provider of electricity, water, gas, phone or internet; and
program instructions to determine the outage time, based on the notice.

17. The computer system of claim 15, wherein the program instructions to monitor the outage time of the disruption in the utility service, further comprise:
program instructions to receive the social media news feed from at least one of: one or more service providers, one or more weather companies, one or more news agencies, and one or more social media;
program instructions to process the social media news feed, wherein processing includes applying natural language processing to the social media news feed;
program instructions to determine the disruption; and
program instructions to determine the outage time of the disruption.

18. The computer system of claim 17, wherein the program instructions to monitor the outage time of the disruption in the utility service, further comprise:
program instructions to receive one or more feed riles, wherein the one or more feed rules determine the social media news feed;
program instructions to receive one or more weight rules, wherein the one or more weight rules determine a weight applied to each news feed;
program instructions to weight the social media news feed; and
program instructions to determine the outage time of the disruption, based on the weight of the social media news feed.

19. The computer system of claim 15, wherein the program instructions to modify the scheduled time, further comprise:
program instructions to determine whether a mitigation action is required, wherein the mitigation action reduces an effect of the disruption;
responsive to a determination that the mitigation action is required, program instructions to determine the mitigation action, wherein the mitigation action is completed at a mitigation time by the internet-connected device;
program instructions to schedule the mitigation action; and
program instructions to transmit the mitigation action to the internet-connected device.

20. The computer system of claim 15, wherein the program instructions to modify the scheduled time, further comprise:
program instructions to receive one or more mitigation rules;
program instructions to determine whether a mitigation action is required, wherein the one or more mitigation rules determine whether a mitigation action is required;
responsive to a determination that a mitigation action is required, program instructions to determine the mitigation action, wherein the one or more mitigation rules determine the mitigation action;
program instructions to schedule the mitigation action; and
program instructions to transmit the mitigation action to the internet-connected device.

* * * * *